(No Model.)
H. H. WATSON.
CAR WHEEL AND AXLE.
No. 342,657.      Patented May 25, 1886.
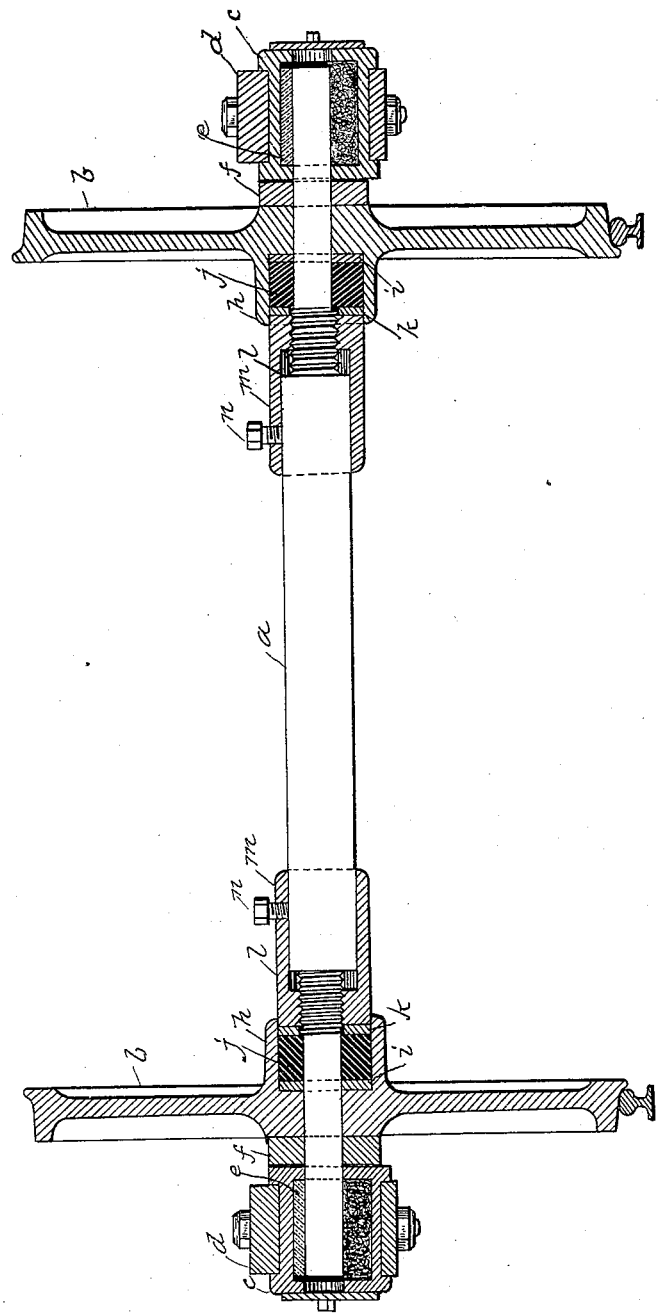
WITNESSES:
H. Brown.
Arthur U. Crossley.
INVENTOR:
Henry H. Watson.
by Wright, Brown & Crossley,
Attys.

UNITED STATES PATENT OFFICE.

HENRY HOLDEN WATSON, OF WALTHAM, MASSACHUSETTS.

CAR WHEEL AND AXLE.

SPECIFICATION forming part of Letters Patent No. 342,657, dated May 25, 1886.

Application filed December 10, 1885. Serial No. 185,293. (No model.)

*To all whom it may concern:*

Be it known that I, HENRY HOLDEN WATSON, of Waltham, in the county of Middlesex and State of Massachusetts, have invented certain new and useful Improvements in Car Wheels and Axles, of which the following is a specification.

My invention relates to the wheels and axles of cars, and particularly to that class of cars in which the wheels are loosely mounted on the axle, so as to turn either thereon or therewith, and has for its object to so mount the wheels upon their axles as that the uneven wear of the journals in their boxes or bearings, and other objections now experienced, will be avoided.

To the ends mentioned my invention consists in mounting the wheels upon their axles, so that they will be normally free to turn thereon, but frictionally secured thereto in such a way as that they cannot turn independently of the axle without the application of considerable force or strain, as when the car is passing around curves, and the distance traveled by the wheels on the same axle varies in accordance with the variation in the radius of the two rails, all as hereinafter described, and subsequently pointed out in the claims.

In the drawing accompanying and forming a part of this specification I have represented a vertical sectional view of two wheels of a car and parts immediately connected therewith, showing my improved means for mounting the wheels on their axle, the latter being shown in elevation.

*a* represents the axle; *b*, the wheels; *c*, the journal-boxes; *d*, the supports therefor, and *e* the journal-bearings of a car, all as ordinarily constructed, except as to the axle, the peculiar or novel features of which will be hereinafter explained, the description being confined for the most part to the manner of mounting a single wheel, though my invention comprehends the mounting of both wheels on the same axle in the same manner.

On the axle, between the wheel and the box *c*, a collar, *f*, is rigidly secured. I have shown the collar as shrunk upon the axle; but any other means of securing it rigidly to the axle may be employed—as, for instance, set-screws or a key, both of which means are well understood by those skilled in the art.

The hub of the wheel on the inner side is extended, as represented at *h*, and a chamber is formed in this extended portion, as shown. A loose ring or washer, *i*, surrounding the axle, is placed against the inner side of the chamber, and adjacent to this, and also surrounding the axle, is a spring, *j*, in the present instance composed of rubber. A washer, *k*, similar to washer *i*, is placed against the spring *j*, its outer face being in the normal condition on the spring, about flush with the face of the end of hub *h*. The axle is offset at *l*, a short distance inward beyond the end of hub *h*, making the ends of said axle smaller in diameter than its middle portion. The axle is screw-threaded on its smaller part for a suitable distance beyond the offset, and an adjusting-sleeve, *m*, adapted at its inner end to fit over the larger part of the axle, and provided at its outer end, or that adjacent to the ring *k*, with a screw-threaded bore of the diameter of the screw-threaded portion of the axle, is placed upon the axle in the manner shown, the part having the larger bore being slipped upon the larger part of the axle, and the internally-screw-threaded part or part having the smaller bore being screwed upon the screw-threaded part of the axle. A set-screw, *n*, passes through the sleeve near its inner end, and abuts or bears against the surface of the larger portion of the axle. Slight space is left between the fixed collar *f* and the inner end of the box *c*, and between the outer end of the axle and the adjacent portion of the box, to provide for the requisite play of the box on the axle.

Any suitable means for lubricating the journal and bearing in the box may be employed.

The operation of my invention will now be readily understood. The adjusting-sleeve is first placed upon the axle and screwed back thereon. Then the ring *i*, spring *j*, and ring *k* are placed in the chamber of the extended hub *h* and the wheel is slipped upon the axle, the ring *k* resting against the outer end of the adjusting-sleeve. The collar *f* is now shrunk upon or keyed to the axle, or secured thereto by set-screws, or in any other suitable way rigidly affixed thereto, and the wheel is in position to be frictionally secured to the axle, in the manner and for the purpose hereinbefore mentioned, and this is done by screwing the sleeve outward until it shall bear against the rings $i$ and $k$ and spring $j$ and press the side of the wheel adjacent to the collar $f$ against said collar with sufficient force to prevent or hold the wheel to the extent that may be desired from turning on its axle. The set-screw $n$ is then turned down, and the adjusting-sleeve is thus locked or secured in proper position.

By the means described I am enabled to so mount car-wheels upon their axles as to bring the entire wear of the journals on that part thereof which operates in the usual journal-boxes, except at times when the distances traveled by the wheels is unequal, as when rounding curves and the radius of the two rails is unequal, at which times the wheels are allowed to turn independently of the axle to compensate for the unequal distances so traveled, and are held at all other times securely on the axle to turn therewith, as in cars now most commonly constructed.

Any suitable means may be provided for supplying oil or other lubricant to the axle at the point where the wheel turns upon it and between the outer face end of the hub and the fixed collar.

The wheels in different classes of cars are generally required to be held on their axles with different security or force, and my invention permits this force to be varied or adjusted as the character of the cars or circumstances may demand.

The importance and value of my invention is thus made apparent, the peculiar or distinguishing feature of which is the mounting of the two wheels directly on the axle, one at each end thereof, by such means and in such manner as to frictionally hold them from turning thereon when the distance traveled by the wheels is the same, but so as to permit each to turn on the axle independently of the other and of the turning of the axle when the distance traveled by one wheel shall vary from that of its fellow on the same axle, whereby friction and wear of the parts are reduced to the minimum, and the power required for propelling the car is also reduced.

It is obvious that instead of the rubber spring $j$ a strong spiral spring may be used, and that the rings $i$ and $k$ may be dispensed with, and other changes in the form and arrangement of various parts of my invention may be made without departing from its spirit or limit.

Having thus described my invention, I claim—

1. The combination, with the axle having collars rigidly secured thereto, of the two wheels directly mounted on the axle, one at each end thereof, having one of the faces of their hubs resting against said collars, a spring bearing against the other face of the hubs for frictionally holding said wheel from turning with freedom on the axle independently of the other and of the turning of the axle when the distance traveled by the wheels shall vary, and devices for adjusting the degree of pressure of said springs against said wheels, as set forth.

2. The combination, with the axle having collars rigidly secured thereto, of the two wheels directly mounted thereon, one at each end thereof, having one of the faces of their hubs resting against said collars, springs bearing against the other face of the hubs, and sleeves adjustable longitudinally on the axle, and having one of their ends bearing against said springs for frictionally holding said wheels from turning with freedom on the axle, but permitting each to turn independently of the other and of the turning of the axle when the distance traveled by the two wheels shall vary, as set forth.

3. The combination, with the axle having collars rigidly secured thereto, of the wheels having one of the faces of their hubs resting against said collars, and provided on their opposite sides with extended hubs, chambered substantially as set forth, springs arranged in said chambers and bearing against the wheels, and sleeves adjustable longitudinally on the axle and having one of their ends bearing against said springs, as set forth.

4. The combination, with the axle $a$, of the collar E, rigidly secured thereto, the wheel $b$, having the chambered hub $h$, rings $i$ and $k$, spring $j$, and adjustable sleeve $m$, as set forth.

In testimony whereof I have signed my name to this specification, in the presence of two subscribing witnesses, this 9th day of December, 1885.

HENRY HOLDEN WATSON.

Witnesses:
C. F. BROWN,
ARTHUR W. CROSSLEY.